Figure 1:
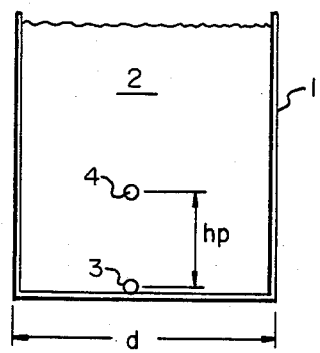

United States Patent [19]

Johnson

[11] Patent Number: 4,630,478
[45] Date of Patent: Dec. 23, 1986

[54] LIQUID VOLUME SENSOR SYSTEM

[75] Inventor: Dennis Johnson, Saskatoon, Canada

[73] Assignee: Pakwa Engineering Ltd., Saskatoon, Canada

[21] Appl. No.: 620,966

[22] Filed: Jun. 15, 1984

[30] Foreign Application Priority Data

Jun. 23, 1983 [CA] Canada ................................ 431065

[51] Int. Cl.$^4$ ............................................. G01F 23/14
[52] U.S. Cl. .......................................... 73/299; 73/438
[58] Field of Search ................... 73/299, 438; 364/509

[56] References Cited

U.S. PATENT DOCUMENTS

| | | | |
|---|---|---|---|
| 2,736,199 | 2/1956 | Ibbott | 73/302 X |
| 3,038,336 | 6/1962 | Peters | 73/299 |
| 3,262,313 | 7/1966 | Hanna | 73/302 |
| 3,473,379 | 10/1969 | Stephens et al. | 73/301 |
| 3,853,006 | 12/1974 | Lawford | 73/301 |
| 4,006,635 | 2/1977 | Khoi | 73/301 X |
| 4,109,531 | 8/1978 | Lawford et al. | 73/438 |
| 4,136,567 | 1/1979 | Rosenblum | 73/438 |
| 4,258,745 | 3/1981 | Nicholson | 73/302 X |
| 4,332,166 | 6/1982 | Lawford | 73/299 |

*Primary Examiner*—Daniel M. Yasich
*Attorney, Agent, or Firm*—Edward E. Pascal

[57] ABSTRACT

This invention relates to apparatus for determining the amount of liquid in a tank by measuring the pressure at the bottom and at a height above the bottom of the tank, and provides apparatus for compensating for apparent volume measurement variations caused by expansion and contraction of the tank and liquid with variation in temperature. A tube which expands in length at an exactly compensating rate varies the height of the second pressure sensor relative to the first. A further embodiment is a pneumatic system which avoids the necessity to immerse the pressure sensor, and utilizes an inexpensive single differential pressure transducer instead of two, and which cancels out the effect of any changes in zero setting of the transducer, changes in sensitivity of the transducer, or changes in atmospheric pressure.

13 Claims, 3 Drawing Figures

U.S. Patent
Dec. 23, 1986
4,630,478

LIQUID VOLUME SENSOR SYSTEM

This invention relates to a system for measuring the volume of liquid in a tank.

It is sometimes required to determine the volume of liquid in a tank, e.g. oil, chemicals, etc. One way of measurement is to calibrate the interior height of a tank by means of a scale. Knowing the diameter of the tank, the height of the liquid in a tank can be read from the scale, and the volume of liquid can be calculated.

However it is often inconvenient to read the scale, since the tank may be closed, and it is time consuming, difficult to read the scale, and often dangerous to climb to the top of the tank to obtain a reading.

It is therefore desirable to obtain an accurate measurement of the volume of liquid in the tank from a remote location. Systems have been devised for determining the density of liquid in a tank using differential pressure gauges, for example in U.S. Pat. No. 4,136,567 issued Jan. 30th, 1979 to Noranda Mines Limited, U.S. Pat. No. 4,043,193 issued Aug. 23rd, 1977 to Bailey Mud Monitors Inc., or for measuring specific gravity of a liquid using differential pressure gauges as described in U.S. Pat. No. 2,354,847 issued Aug. 1st, 1944 to The Electric Storage Battery Company. In those patents, a differential pressure gauge is inserted into the liquid, one gauge directly above the other. However the volume of liquid cannot be determined.

U.S. Pat. No. 3,038,336, issued June 12th, 1936, invented by M. F. Peters describes a system for measuring both the height and density of a liquid in a closed tank. However the height determination depends on first determining the density. Further, the system requires the use of a closed tank, and no provision is made for the apparent change in measured volume of the liquid caused by expansion or contraction of the tank or of the liquid due to temperature changes.

The present invention is a system for determining the height of liquid in an unsealed or sealed tank, in which the determined volume (height×cross-sectional area) does not change with variations in temperature (i.e. giving an indication of mass, which is independent of temperature). In other words the volume is determined based on a predetermined reference temperature (which can be any selected temperature), the apparatus automatically compensating for apparent height (and resulting pressure) differences caused by expansion and contraction of the liquid to be measured, and expansion and contraction of the tank holding the liquid, caused by temperature changes of the tank material. A determination of the volume in this manner is often important since payment for storage or delivery of liquid is sometimes based on the volume. Apparent changes in volume caused by expansion or extraction can cause substantial differences in payments made or received, and differences in estimations of amount of liquid which is stored or delivered.

In the present invention, the liquid pressure at the bottom of the tank and at a predetermined height above the bottom of the tank are determined, in which the height between the measuring points is known. By multiplying the aforenoted height by the quotient of the pressure at the bottom divided by the pressure differential between the two points, and multiplying the resulting product by the cross-sectional area of this tank, the volume of liquid in the tank can be determined.

According to a preferred form of the invention, apparatus is provided to automatically raise or lower the pressure measuring point at the height above the bottom of the tank by an amount which compensates for the change in liquid pressure caused by expansion or contraction of the tank and of the liquid caused by temperature variations, thus maintaining the accuracy of measurement even in the presence of the pressure change.

According to the preferred embodiment of the invention, the present apparatus for determining the volume of a liquid relative to a known reference temperature in a tank is comprised of a first apparatus for determining the pressure of a liquid at a bottom of a tank, second apparatus for determining the pressure of a liquid at a height above the bottom of the tank, a first adjustment tube closed at one end, and closed at the other end by an expansion apparatus (preferably a bellows), the tube being formed of material having similar temperature coefficient of expansion as that of a tank, and being filled with a liquid having temperature coefficient of expansion similar to that of the liquid in the tank, whereby the expansion apparatus moves outwardly or inwardly axially of the tube with expansion or contraction of the liquid in the tube. The first and second apparatus are located such that upon immersion into the tank with the second apparatus vertically above the first apparatus, they are separated by the ends of the tube, their separation defining the height. With expansion of the liquid of the tube, their separation changes due to expansion or contraction of the apparatus. The pressure differential of the liquid at the location of the first and second apparatus can be determined thereby as a parameter for obtaining an indication of the volume of liquid in the tank independently of the effects of expansion of liquid in the tank due to temperature changes.

Preferably the material of the tube is the same as the material of the tank, and the liquid filling the tube is the same as the liquid filling the tank.

According to a further embodiment, the first apparatus is a first elongated tube for disposition of one end at the bottom of the tank, and the second apparatus is a second elongated tube for disposition of one end at a known height above the one end of the first tube. A gas is applied to the elongated tubes at pressures equal to the pressures of the liquid at the respective heights of the aforenoted ends. This can be effected by allowing the gas to bubble very slowly out of the tubes in the liquid.

A differential pressure gauge located at the other ends of the elongated tubes (which are drawn out of the tank and located at a convenient operator or equipment position) is used to determine the pressures of the gas in the tubes, which provide a determination of the liquid pressures at the ends of the tubes. These pressures can be used to determine the volume of the liquid, in an apparatus to be described below.

According to this embodiment, a linear differential pressure transducer is provided having a pair of inputs. First pressure indications are provided from a position in the tank adjacent the bottom of the tank and from the atmosphere immediately above the liquid to the inputs, to obtain a first differential pressure determination. Second pressure indications are provided from a position in the tank above the bottom of the tank and from the atmosphere immediately above the liquid to the inputs, separately from the first pressure indications, to obtain a second differential pressure determination. The second and first pressure determinations are subtracted to obtain a pressure differential determination, whereby any changes in a zero setting in the pressure transducer or changes in atmospheric pressure are cancelled. The total volume of liquid in the tank is determined by operating the algorithm $$V = \frac{P_o}{D} \times A \times h_p$$

where
V represents the total volume of liquid in the tank,
$P_o$ represents the first pressure determination,
D represents the pressure differential determination,
A represents the cross-sectional area of the tank, a constant, and
$h_p$ represents said height.

The value of V is displayed on a display.

Figure 2:
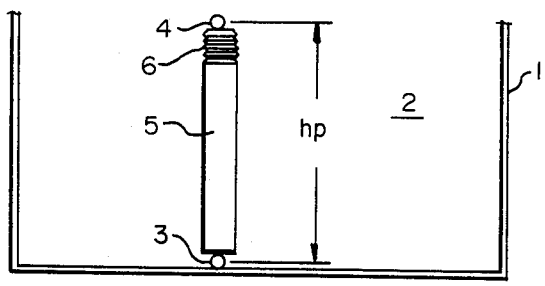
Figure 3:
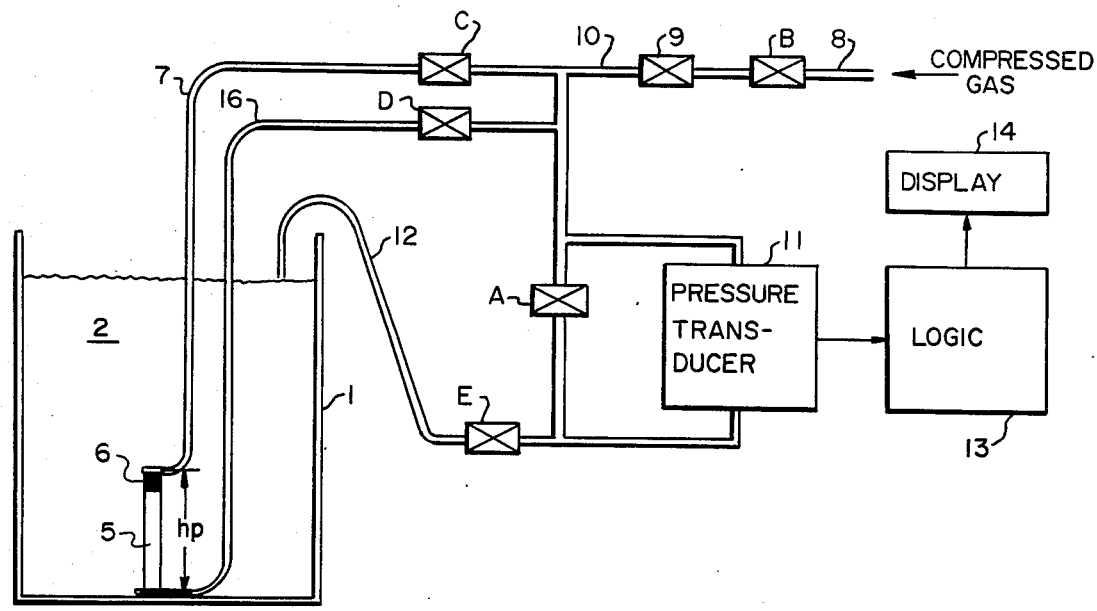

A better understanding of the invention will be obtained by reference to the detailed description below, in conjunction with the following drawings, in which:

FIG. 1 is a sectional view of a tank illustrating the application of the invention, FIG. 2 is a sectional view of a tank showing an embodiment of the invention, and FIG. 3 is a sectional view of a tank showing a further embodiment of the invention.

FIG. 1 illustrates a tank 1 in section which contains a liquid 2, the volume of which is to be determined. A pressure transducer 3 or other apparatus which can determine the pressure of the liquid is located at the bottom of the tank. A second pressure transducer 4 or apparatus that can determine the pressure of the liquid is located above the pressure transducer 3 at a height $h_p$. Pressure transducers re well known, e.g. one is described in U.S. Pat. No. 4,136,567. The actual structure of the pressure transducer is not the subject of the present invention.

Assuming that the tank is round, it has a diameter d. However in order to determine the volume, the cross-sectional area of the tank must be known (assuming that it is a vertical walled tank).

It has been determined that the volume of liquid in the tank can be given by $$V = \frac{P_o}{P_o - P_p} \times A \times h_p$$

where
$P_o$ is the pressure at the base of the tank,
$P_p$ is the pressure of the liquid at a height $h_p$ above the base, and
A is the cross-sectionl area of the tank.

Clearly the pressure transducers 3 and 4 can output signals which are applied to a logic circuit which performs the algorithm expressed above, A and $h_p$ being constant signals which can be adjusted by means of controls at an operator position panel.

It is preferred that transducer 4 should be located directly above transducer 3, since the transducers can be inserted into the tank, both connected to a single structural member; the distance between the transducers as mounted on the structural member then gives the value $h_p$.

The volume of liquid in the tank, however, is a function of its temperature since both its tank and the liquid itself expand and contract with temperature. For many applications the parameter of interest is really the mass of liquid in the tank, rather than the volume, (mass being independent of temperature). The structure shown in FIG. 2 can be utilized to provide an indication of the volume independent of temperature (i.e. the mass). The structure of FIG. 2 causes the height $h_p$ to vary with temperature in order to exactly compensate for the change in apparent volume caused by expansion or contraction of the tank caused by change in temperature and the expansion or contraction of the liquid caused by change in temperature.

In FIG. 2 a tube or pipe 5 separates the pressure transducers 3 and 4. Both ends of the tube 5 are closed, one end being closed by an expansion member, preferably in the form of bellows 6 thereby forming an expansion tube. It has been found that the required compensation occurs when the tube 5 is formed of material which has a similar temperature coefficient of expansion as the tank, and is filled with a liquid which has a similar temperature coefficient of expansion as the liquid in the tank. Its diameter is made small relative to that of the tank, for reason of convenience. The pressure transducers 3 and 4 are mounted against the ends of the pipe so that expansion or contraction of the bellows 6 moves the pressure transducer 4, thus changing the height $h_p$. This will occur with expansion and contraction of the pipe 5 and the liquid contained within it with changes in temperature, this occurring at the same time as expansion or contraction of tank 1 and liquid 2.

It is preferred, and it will be most convenient, to have the tube 5 made of the same material as tank 1, and tube 5 filled with the same liquid as is being measured in the tank.

Of course if desired bellows can be used to seal both ends of the tube 5.

By providing the pressure measurements to a logic circuit, as described earlier, a determination of the mass (which is related to the volume independent of temperature) rather than of volume which is dependent on temperature, is obtained. The volume determined by the algorithm described earlier is thus really the volume at a known reference temperature, equivalent to measuring the mass of the liquid. The reference temperature may be any convenient temperature at which the dimension $h_p$ was initially set.

Because of the nature of the liquid or the tank, it may be inconvenient to immerse pressure transducers into the liquid. Accordingly the embodiment shown in FIG. 3 can be used. FIG. 3 shows the use of pressure compensation with temperature pipe 5 and bellows 6 utilized in tank 1, but it should be realized that if compensation is not desired, it can be deleted, which will result in the embodiment shown in FIG. 1, but with remote pressure sensing.

Rather than utilizing pressure transducers 3 and 4, elongated tubes 7 and 16 are used to obtain a remote reading. One end of elongated tube 16 is placed adjacent the bottom of the tank in place of transducer 3, and one end of elongated tube 7 is placed or fixed at a height $h_p$ above the end of elongated tube 16. If the compensation embodiment is used, bellows 6, expanding or contracting to compensate for volume changes with temperature, will cause the end of elongated tube 7 to move up or down relative to the end of elongted tube 16, changing the height $h_p$.

A source of compressed gas is applied to a pipe 8, which gas passes through a valve B, a flow rate limiter 9, and via pipe 10 is applied to tubes 7 and 16 via valves C and D. Pipe 10 is also coupled to one side of a differential pressure transducer 11, and to the other side of differential pressure transducer 11 through a valve A. The latter side of pressure transducer 11 is coupled to an elongated tube 12 through a valve E. The elongated tube 12 has its other end located just above the top surface of liquid 2, open to the atmosphere.

In operation, the compressed gas is fed into elongated tubes 7 and 16 at a very slow rate so that a very small amount of gas flows through tubes 7 and 16 and bubbles out into the liquid. Consequently the pressure at any point in tubes 7 and 16 will be the respective pressures at their ends of the liquid. The tubes are coupled to the pressure transducer as will be described below in order to measure the liquid pressures at the bottom and at a height $h_p$ above the bottom of the tank.

It is preferred that a differential pressure relative to atmospheric pressure should be used so that fluctuations in atmospheric pressure which would add or subtract pressure to the liquid.

In operation, valve A is first opened, all others being closed. The zero offset of the differential pressure transducer (if any) is thus determined.

Where a zero offset value is found to exist, the volume algorithm must take the offset into account by subtracting the offset value from each of the measured pressure readings, i.e.

$$V = \frac{P_{omeas} - P_c}{(P_{omeas} - P_c) - (P_{pmeas} - P_c)}$$

where $P_c$ is the offset pressure reading.

Thus the pressure $P_o$ and $P_c$ in the algorithm described in this specification and claims should be considered as being the measured pressures less the zero offset of the pressure gauge, i.e. $P_o$ represents $P_{o(meas)}P_c$ and $P_p$ represents $P_{p(meas)}-P_c$.

Any sensitivity drift of the pressure gauge cancels out because the algorithm is a ratio of pressure.

The liquid pressure at the bottom of the tank is then determined by opening valves B, D and E, keeping valves A and C closed. The compressed gas is bubbled through tube 6 at a very slow rate as described above. Accordingly the pressure transducer has pressure across it which is the differential between atmospheric and the pressure at the bottom of the tank.

Then valve A is kept closed and valve D is closed, and valves B, C and E are opened. The compressed gas is allowed to flow through tube 7, just enough to counteract the pressure at the end of tube 7 in the liquid. Now the pressure transducer has the differential between atmospheric pressure and the liquid pressure at the height $h_p$ above the bottom of the tank applied to it.

The pressure transducer provides electrical signals corresponding to the zero offset and liquid pressures with respect to atmospheric to logic circuit 13. It is preferred that logic circuit 13 should be a microprocessor, but it can be any circuit, analog or digital which will process the signals with the algorithm described earlier. The logic circuit provides an output circuit signal indicative of the volume, or mass, to a display 14 for viewing by an operator. Indeed, the logic circuit 13 could operate each of the valves A-E in sequence, automatically providing a display at selected or regular intervals.

It should be noted that the differential pressure transducer can be relatively inexpensive, since its major critical requirement is that it should be linear. There is no need for special protection from the liquid, since it does not make contact with it. Further, since the pressure transducer is not located in the liquid, the problem of servicing a pressure transducer inside the tank is eliminated. Indeed, it can be located in a housing having very moderate temperature variations, which will aid in maintaining its accuracy.

With the embodiment shown in FIG. 3, fluctuations in atmospheric pressure add or substract equal amounts to the two measured pressure points. Consequently the differential pressure transducer is not subject to any net effects of these fluctuations, and atmospheric pressure fluctuations has no effect on its accuracy.

Since the zero offset of the pressure transducer can be measured as a part of each measurement sequence, change in the zero offset with time or temperature does not affect the accuracy of the measurement. Variations in sensitivity of the transducer with time or temperature are not important as long as the sensitivity remains substantially constant during the period of one measurement cycle.

The single transducer eliminates the cost of a second transducer which would be required if pneumatic coupling was not used. Further, good linearity is achieved in relatively inexpensive transducers whereas in other parameters such as zero stability and constant sensitivity usually require much more expensive transducers or compensation techniques.

A system has thus been described for determining the amount of liquid in a tank in which the density of a liquid need not be known, and can be used for liquid made up of varying blends of varying density liquids, as is sometimes found in petroleum products or chemicals. In the present system pressures at the two known locations in the tank are the only required measurements, as well as a knowledge of the cross-sectional area of the tank, for determining the amount of liquid. The coupling technique described with reference to FIG. 3 permits the use of only one pressure transducer in such a system and greatly facilitates the elimination of errors due to zero offset and changes in sensitivity of the transducers. Further, a structure has been described which eliminates the changes in apparent volume caused by expansion or contraction of the tank and liquid caused by changes in temperature.

A person understanding this invention may design variations or other embodiments, using the principles described herein. All are considered to be within the scope of this invention as defined in the claims appended hereto.

I claim:

1. Apparatus for determining the volume of liquid relative to a known reference temperature in a tank comprising:
   (a) first means for determining the pressure of the liquid at the bottom of the tank,
   (b) second means for determining the pressure of the liquid at a height above the bottom of the tank,
   (c) a first tube closed at one end, and closed at the other end by an expansion means, the tube being formed of material having a similar temperature coefficient of expansion as that of the tank, and being filled with a liquid having a temperature coefficient of expansion similar to that of the liquid in the tank, whereby the expansion means moves outwardly or inwardly axially of the tube with expansion or contraction of the tube and liquid in the tube, (d) the first and second means being located such that upon immersion into the tank with said second means vertically above the first means, they are separated by the ends of the tube, their separation defining said height, and whereby with expansion of the expansion means, their separation changes, (e) the expansion means being comprised of a bellows, individual first and second elongated tubes, means for disposing one end of one elongated tube at the end of said first tube, means for disposing one end of the other elongated tube at the end of the bellows opposite said first tube, and a third elongated tube, means for disposing one end of the third elongated tube in the atmosphere just above the surface of the liquid, a source of compressed gas, means for applying the compressed gas to the first and second elongated tubes at pressures just balancing the liquid pressures at the bottom of the tank and at said height respectively, a differential pressure transducer, means for connecting inputs to the transducer to the third and first elongated tubes respectively to obtain a measure of the liquid pressure at the bottom of the tank relative to atmospheric pressure, means for connecting inputs to the transducer to the third and second elongated tubes respectively to obtain a measure of the liquid pressure at said height relative to atmospheric pressure, and means for providing an output signal from the transducer corresponding to said pressures, relative to atmospheric, whereby the pressure differential of the liquid at the locations of said first and second means can be determined as a parameter for obtaining an indication of the volume of liquid in the tank independently of the effects of expansion of the liquid and of the tank due to their temperature changes.

2. Apparatus for determining the volume of liquid relative to a known reference temperature in a tank comprising:

(a) first means for determining the pressure of the liquid at the bottom of the tank, (b) second means for determining the pressure of the liquid at a height above the bottom of the tank, (c) a first tube closed at one end, and closed at the other end by an expansion means, the tube being formed of material having a similar temperature coefficient of expansion as that of the tank, and being filled with a liquid having a temperature coefficient of expansion similar to that of the liquid in the tank, whereby the expansion means moves outwardly or inwardly axially of the tube with expansion or contraction of the tube and liquid in the tube, (d) the first and second means being located such that upon immersion into the tank with said second means vertically above the first means, they are separated by the ends of the tube, their separation defining said height, and whereby with expansion of the expansion means, their separation changes, (e) the expansion means being comprised of a bellows, individual first and second elongated tubes, means for disposing one end of one elongted tube at the end of said first tube, means for disposing the other elongated tube at the end of the bellows opposite said first tube, and a third elongated tube, means for disposing one end of the third elongated tube in the atmosphere just above the surface of the liquid, a source of compressed gas, valve means for applying the compressed gas selectively to the first and second elongated tubes at pressures just balancing the liquid pressures at the bottom of the tank and at said height respectively, a differential pressure transducer, means for connecting inputs to the transducer to the third and first elongated tubes respectively to obtain a measure of the liquid pressure at the bottom of the tank relative to atmospheric pressure, means for connecting inputs to the transducer to the third and second elongated tubes respectively to obtain a measure of the liquid pressure at said height relative to atmospheric pressure, and means for providing an output signal from the transducer corresponding to said pressures relative to atmospheric, whereby the pressure differential of the liquid at the locations of said first and second means can be determined as a parameter for obtaining an indication of the volume of liquid in the tank independently of the effects of expansion of the liquid and of the tank due to their temperature changes.

3. Apparatus for determining the volume of liquid relative to a known reference temperature in a tank comprising:

(a) first means for determining the pressure of the liquid at the bottom of the tank, (b) second means for determining the pressure of the liquid at a height above the bottom of the tank, (c) a first tube closed at one end, and closed at the other end by an expansion means, the tube being formed of material having a similar temperature coefficient of expansion as that of the tank, and being filled with a liquid having a temperature coefficient of expansion similar to that of the liquid in the tank, whereby the expansion means moves outwardly or inwardly axially of the tube with expansion or contraction of the tube and liquid in the tube, (d) the first and second means being located such that upon immersion into the tank with said second means vertically above the first means, they are separated by the ends of the tube, their separation defining said height, and whereby with expansion of the expansion means, their separation changes, (e) the expansion means being comprised of a bellows, individual first and second elongated tubes, means for disposing one end of one elongated tube at the end of said first tube, means for disposing the other elongated tube at the end of the bellows opposite said first tube, and a third elongated tube, means for disposing one end of the third elongated tube in the atmosphere just above the surface of the liquid, a source of compressed gas, valve means for applying the compressed gas selectively to the first and second elongated tubes at pressures just balancing the liquid pressures at the bottom of the tank and at said height respectively, a differential pressure transducer, means for connecting inputs to the transducer to the third and first elongated tubes respectively to obtain the liquid pressure at the bottom of the tank relative to atmospheric pressure, means for connecting inputs to the transducer to the third and second elongated tubes respectively to obtain the liquid pressure at said height relative to atmospheric pressure, means for receiving output signals from the transducer and for generating a signal for a read-out display corresponding to the total volume of liquid in the tank according to the algorithm $$V = \frac{P_o}{P_o - P_p} \times A \times h_p$$

where

V is a signal representing the total volume of liquid in the tank, $P_o$ is a signal representing the liquid pressure at the bottom of the tank, obtained from the transducer, $P_p$ is a signal representing the liquid pressure at said height above the bottom of the tank, obtained from the transducer, A is a signal representing the cross-sectional area of the tank, a constant, $h_p$ is a signal representing said height.

4. Apparatus for determining the volume of a liquid in a tank comprising:
   (a) a first elongated tube for disposition of one end thereof at the bottom of said tank,
   (b) a second elongated tube for disposition of one end thereof above the bottom of the tank at a known height,
   (c) means for applying a gas to the interiors of the elongated tubes at pressures equal to the pressures of said liquid at the respective heights of said one ends,
   (d) a third elongated tube, means for disposing one end of the third elongated tube in the atmosphere immediately above the surface of the liquid, a source of compressed gas, means for applying the compressed gas to the first and second elongated tubes at pressures just balancing the liquid pressures at the bottom of the tank and at said height respectively, a differential pressure transducer, means for connecting inputs to the transducer to the third and first elongated tubes respectively to determine the liquid pressure at the bottom of the tank relative to atmospheric pressure, means for connecting inputs to the transducer to the third and second elongated tubes respectively to determine the liquid pressure at said height relative to atmospheric pressure, and means for providing an output signal from the transducer corresponding to said pressures relative to atmospheric,
   (e) translating means for receiving signals from said transducer corresponding to said pressures and determining the total volume of liquid in the tank by providing an output signal having the value $$V = \frac{P_o}{P_o - P_p} \times A \times h_p$$

where

V is a signal representing the total volume of liquid in the tank, $P_o$ is a signal representing the liquid pressure at the bottom of the tank, $P_p$ is a signal representing the liquid pressure at said height above the bottom of the tank, A is a signal representing the cross-sectional area of the tank, a constant, $h_p$ is a signal representing said height.

5. Apparatus for determining the volume of a liquid in a tank comprising:
   (a) a first elongated tube for disposition of one end thereof at the bottom of said tank,
   (b) a second elongated tube for disposition of one end thereof above the bottom of the tank at a known height,
   (c) means for applying a gas to the interiors of the elongated tubes at pressures equal to the pressures of said liquid at the respective heights of said one ends,
   (d) a vertically disposed expansion tube closed at one end, and closed at the other end by an expansion means, means for disposing one end of one elongated tube against the closed end of said expansion tube, means for disposing the other elongated tube against the end of the expansion means opposite said first tube, and a third elongated tube, means for disposing one end of the third elongated tube in the atmosphere immediately above the surface of the liquid, a source of compressed gas, valve means for applying the compressed gas selectively to the first and second elongated tubes at pressures just balancing the liquid pressures at the bottom of the tank and at said height respectively, a differential pressure transducer, means for connecting inputs to the transducer to the third and first elongated tubes respectively to determine the liquid pressure at the bottom of the tank relative to atmospheric pressure, means for connecting inputs to the transducer to the third and second elongated tubes respectively to determine the liquid pressure at said height relative to atmospheric pressure, means for providing an output signal from the transducer corresponding to said pressures relative to atmospheric, and
   (e) translating means for receiving signals corresponding to said pressures and determining the total volume of liquid in the tank by providing an output signal having the value $$V = \frac{P_o}{P_o - P_p} \times A \times h_p$$

where

V is a signal representing the total volume of liquid in the tank, $P_o$ is a signal representing the liquid pressure at the bottom of the tank, $P_p$ is a signal representing the liquid pressure at said height above the bottom of the tank, A is a signal representing the cross-sectional area of the tank, a constant, $h_p$ is a signal representing said height.

6. Apparatus as defined in claim 4 or 5 including means for translating said signals representing said pressures to obtain an indication of a pressure differential at said one end of the first and second tubes unaffected by changes in sensitivity of the differential pressure transducer or changes in atmospheric pressure.

7. Apparatus for determining the volume of liquid relative to a known reference temperature in a tank comprising:
   (a) first means for determining the pressure of the liquid at the bottom of the tank,
   (b) second means for determining the pressure of the liquid at a height above the bottom of the tank,
   (c) a first tube closed at one end, and closed at the other end by an expansion means, the tube being formed of material having a similar temperature coefficient of expansion as that of the tank, and being filled with a liquid having a temperature coefficient of expansion similar to that of the liquid in the tank, whereby the expansion means moves outwardly or inwardly axially of the tube with expansion or contraction of the tube and liquid in the tube, (d) the first and second means being located such that upon immersion into the tank with said second means vertically above the first means, they are separated by the ends of the tube, their separation defining said height, and whereby with expansion of the expansion means, their separation changes, (e) said expansion means being comprised of bellows, individual first and second elongated tubes, means for disposing one end of one elongated tube against said one of said first tube, means for disposing one end of the other elongated tube against the end of the bellows opposite said first tube, and a third elongated tube, means for disposing one end of the third elongated tube in the atmosphere immediately above the surface of the liquid, a source of compressed gas, valve means for applying the compressed gas selectively to the first and second elongate tubes at pressures just balancing the liquid pressures at the bottom of the tank and at said height respectively, a differential pressure transducer, means for connecting inputs to the transducer to the third and first elongated tubes respectively to determine the liquid pressure at the bottom of the tank relative to atmospheric pressure, means for connecting inputs to the transducer to the third and second elongated tubes respectively to determine the liquid pressure at said height relative to atmospheric pressure, whereby the pressure differential of the liquid at the locations of said first and second means can be determined as a parameter for obtaining an indication of the volume of liquid in the tank independently of the effects of expansion of the liquid and of the tank due to their temperature changes, and means for receiving output signals from the transducer and for generating a signal for a read-out display corresponding to the total volume V of liquid in the tank according to the algorithm $$V = \frac{P_o}{P_o - P_p} \times A \times h_p$$

where
V is a signal representing the total volume of liquid in the tank,
$P_o$ is a signal representing the liquid pressure at the bottom of the tank, obtained from the transducer,
$P_p$ is a signal representing the liquid pressure at said height above the bottom of the tank, obtained from the transducer,
A is a signal representing the cross-sectional area of the tank, a constant,
$h_p$ is a signal representing said height.

8. Apparatus for determining the volume of liquid in a tank comprising:
(a) first means for determining the pressure of the liquid at the bottom of the tank,
(b) second means for determining the pressure of the liquid at a height above the bottom of the tank,
(c) means for disposing the second means a predetermined distance above the first means within the liquid of the tank,
(d) means for receiving signals corresponding to said pressures and for determining the total volume of liquid in the tank by providing an output signal having the value $$V = \frac{P_o}{P_o - P_p} \times A \times h_p$$

where
V is a signal representing the total volume of liquid in the tank,
$P_o$ is a signal representing the liquid pressure at the bottom of the tank, obtained from the first means,
$P_p$ is a signal representing the liquid pressure at said height above the bottom of the tank, obtained from the second means,
A is a signal representing the cross-sectional area of the tank, a constant,
$h_p$ is a signal representing said height, and
(e) means for raising or lowering the second means an amount just sufficient to compensate for pressure variations at the first and second means caused by expansion or contraction of the tank and liquid caused by variations in temperature.

9. Apparatus for determining the volume of the liquid in a tank comprising:
(a) a linear differential pressure transducer having a pair of inputs,
(b) means for applying respective first pressure indications from a position in the tank adjacent the bottom of the tank and from the atmosphere immediately above the liquid to said inputs, to obtain a first differential pressure determination,
(c) means for applying respective second pressure indications from a position in the tank above the bottom of the tank and from the atmosphere immediately above the liquid to said inputs, separately from the first pressure indications, to obtain a second differential pressure determination,
(d) means for subtracting the second and frist pressure determinations to obtain a pressure differential determination, whereby any changes in a zero setting in the pressure transducer or changes in atmospheric pressure are cancelled,
(e) means for determining the total volume of liquid in the tank by operating the algorithm $$V = \frac{P_o}{D} \times A \times h_p$$

where
V represents the total volume of liquid in the tank,
$P_o$ represents the first pressure determination,
D represents the pressure differential determination,
A represents the cross-sectional area of the tank, a constant, and
$h_p$ represents said height, and (f) displaying the value V, in which the means for applying the first and second pressure indications are comprised of pneumatic hoses.

10. Apparatus for determining the volume of the liquid in a tank comprising:
(a) a linear differential pressure transducer having a pair of inputs, (b) means for applying respective first pressure indications from a position in the tank adjacent the bottom of the tank and from the atmosphere immediately above the liquid to said inputs, to obtain a first differential pressure determination, (c) means for applying respective second pressure indications from a position in the tank above the bottom of the tank and from the atmosphere immediately above the liquid to said inputs, separately from the first pressure indiations, to obtain a second differential pressure determination, (d) means for subtracting the second and first pressure determinations to obtain a pressure differential determination, whereby any changes in a zero setting in the pressure transducer or changes in atmospheric pressure are cancelled, (e) means for determining the total volume of liquid in the tank by operating the algorithm $$V = \frac{P_o}{D} \times A \times h_p$$

where

V represents the total volume of liquid in the tank, $P_o$ represents the first pressure determination, D represents the pressure differential determination, A represents the cross-sectional area of the tank, a constant, and $h_p$ represents said height, and (f) displaying the value V, in which the pressure transducer provides electrical signals representing said first and second pressure determinations, and in which the means for subtracting and means for operating the algorithm are comprised of an electronic circuit connected to the transducer for receiving said signals and providing a signal representing the value V to an electronic display means.

11. Apparatus as defined in claim 9 or 10 including means for varying the vertical height of said position above the bottom of the tank an amount just sufficient to compensate for pressure variations at said positions caused by expansion or contraction of the tank and liquid caused by variations in temperature.

12. Apparatus as defined in claim 9 or 10 including a pipe or cylinder having one end closed and the other end closed by an expansion means, the pipe or cylinder being vertically disposed with its closed end at said position adjacent the bottom of the tank and its other end defining said position above the bottom of the tank.

13. Apparatus as defined in claim 9 or 10 including a pipe or cylinder having one end closed the the other end closed by a bellows, the pipe or cylinder being vertically disposed with its closed end at said position adjacent the bottom of the tank and its other end defining said position above the bottom of the tank.

* * * * *